United States Patent [19]
Makkinejad et al.

[11] Patent Number: 5,690,899
[45] Date of Patent: Nov. 25, 1997

[54] PROCESS FOR REMOVING SULPHUR DIOXIDE FROM FLUE GAS

[75] Inventors: Navid Makkinejad, Gummersbach; Mathias Küper, Waltrop; Hildemar Böhm, Gladbeck, all of Germany

[73] Assignee: Lentjes Bischoff GmbH, Essen, Germany

[21] Appl. No.: 687,742

[22] Filed: Jul. 26, 1996

[30] Foreign Application Priority Data

Jul. 29, 1995 [DE] Germany ............ 195 27 836.4
Sep. 23, 1995 [DE] Germany ............ 195 35 475.3

[51] Int. Cl.$^6$ ............................................. B01D 53/50
[52] U.S. Cl. ................. 423/243.01; 423/243.08; 423/DIG. 5
[58] Field of Search ................. 423/DIG. 5, 243.08, 423/243.01

[56] References Cited

U.S. PATENT DOCUMENTS

| | | | |
|---|---|---|---|
| 3,389,829 | 6/1968 | Stanford | 423/243.08 |
| 3,936,525 | 2/1976 | Lanning | 423/242 |
| 4,085,194 | 4/1978 | Otani et al. | 423/242 |
| 4,337,230 | 6/1982 | Ellestad et al. | 423/242 |
| 4,804,523 | 2/1989 | Abrams et al. | 423/242 |
| 4,976,936 | 12/1990 | Rathi et al. | 423/242 |
| 5,141,727 | 8/1992 | Varney | 423/242 |

FOREIGN PATENT DOCUMENTS

| | | |
|---|---|---|
| 0 151 398 A1 | 8/1985 | European Pat. Off. |
| 0 246 758 A2 | 11/1987 | European Pat. Off. |
| 0 295 908 A2 | 12/1988 | European Pat. Off. |
| 0 406 446 A1 | 1/1991 | European Pat. Off. |
| 2 183 955 A | 12/1973 | France |
| 2133481 | 4/1973 | Germany |
| 288100 | 3/1991 | Germany ............ 423/243.08 |
| 49-52762 | 5/1974 | Japan |
| 52-32894 | 3/1977 | Japan ............ 423/243.08 |
| 60-261531 | 12/1985 | Japan ............ 423/243.08 |
| 156235 | 2/1980 | Norway |

OTHER PUBLICATIONS

Glenna et al. "ABGas–Entschwefelungsanlage Mit Meerwasser Als Absorptionsmittel" published in Verfahrenstechnik vol. 25, No. 9 (1991, no month) pp. 12 and 13.

Sintef Report No. STF 21 A77098 prepared by Hagen et al., Norway (1978–03–08) "Status Report on the Flakt–Hydro Flue Gas Desulfurization Process (Sea Water Scrubbing)" pp. 1–34 ISBN–82–595–1422–2.

*Primary Examiner*—Gary P. Straub
*Assistant Examiner*—Timothy C. Vanoy
*Attorney, Agent, or Firm*—Herbert Dubno; Jonathan Myers

[57] ABSTRACT

Sulfur dioxide is removed from flue gas by scrubbing with sea water and aeration of the sump to convert the removed sulfur dioxide into bisulfate with neutralization in a reaction basin subsequently forming sulfate. The neutralization is carried out by the treatment of sea water and a pH of 4 to 5 and preferably 4.15 to 4.5 is maintained in the liquid phase removed from the sump by controlled recycling of the sump liquid to the absorption zone or addition of further quantities of sea water to the column.

9 Claims, 4 Drawing Sheets

PROCESS FOR REMOVING SULPHUR DIOXIDE FROM FLUE GAS

FIELD OF THE INVENTION

The present invention relates to a process or method of removing or separating sulfur dioxide from a waste gas, especially a flue gas, utilizing sea water to scrub the sulfur dioxide from the gas.

BACKGROUND OF THE INVENTION

In German Patent Document 23 22 958, a gas cleaning process is described in which sea water is used as an absorption liquid to remove sulfur dioxide from a waste gas stream such as a flue gas.

In this process, the flue gas is scrubbed in an absorption column with sea water and the sea water containing the sulfur compounds is withdrawn from the sump of the absorption column and is treated in an after-reaction basin with fresh sea water.

This process has found use in practice and reference may be made to Verfahrenstechnik 25 (1991) Nr. 9, Pages 12–14. The process utilizes the bicarbonates which are present in sea water to convert the absorbed sulfur dioxide into non-toxic sulfates.

The amount of scrubbing liquid required in the absorption zone depends upon the material exchange between the gas phase and the liquid phase. In conventional systems, it is desirable to operate with the smallest possible amounts of scrubbing liquid. To minimize the scrubbing liquid requirements, so-called packed columns are employed, i.e. columns containing filler bodies which insure a good material exchange between the gas and liquid phases.

When sea water is used as the scrubbing liquid and there is a fixed scrubbing liquid requirement, the amount of available bicarbonate is also fixed. As a result, only a fraction of the sulfur dioxide quantity present can be satisfied by the available bicarbonate, with the greater portion of the sulfur dioxide which is contacted by the liquid phase being dissolved in the form of unbound sulfur dioxide which is withdrawn from the sump of the scrubbing column with the scrubbing liquid.

The liquid is also saturated with carbon dioxide because of the high carbon dioxide partial pressure of the flue gas.

Experience has shown that a pH value in the range of pH=2 to pH=3 is established in the liquid sump of the absorption column. In the after-reaction basin, the scrubbing liquid withdrawn from the absorption column is reacted with fresh sea water in an amount so dimensioned that the bicarbonate content suffices to neutralize the extracted sulfur dioxide. The contents of the after-reaction basin must be intensively aerated for sulfate formation on the one hand and, on the other hand, to drive out carbon dioxide. The large amounts of air required can strain compressor capacities.

Furthermore, since the oxidation velocity is pH dependent and in a range above pH=5.5, which is found in the after-reaction basin, is relatively small, large basins are necessary and thus for complete sulfate formation substantial residence times are necessary.

In practice, it is found that aerated reaction basins must be operated with a residence time of 10 to 15 minutes for the desired reactions to go to completion.

Because of the high air velocities volumes used in the region of the reaction basin the noise generation is considerable and usually far in excess of tolerable limits. The unbound sulfur dioxide which has been entrained in the sump liquid may not even be completely oxidized even with extremely strong aeration and release of unbound $SO_2$ into the atmosphere and air pollution in the region of the basin is a significant problem.

OBJECTS OF THE INVENTION

Accordingly, it is principal object of the present invention to provide an improved process for removing sulfur dioxide from waste gases and especially flue gases so that smaller reaction basins can be used, and environmentally detrimental noise loading of high aeration velocities, the danger of the release of noxious or toxic sulfur dioxide and the like may all be avoided.

It is also an object of the invention to reduce the amount of air required for oxidation purposes in a system for removing sulfur dioxide from a flue gas utilizing sea water.

Still another object of the invention is to provide a process for the purposes described which, however, will be economical but free from at least some of the drawbacks outlined above.

SUMMARY OF THE INVENTION

These objects and others which will become apparent hereinafter are attained, in accordance with the invention in a process for removing sulfur dioxide from a flue gas which comprises the steps of:

(a) contacting a flue gas containing sulfur dioxide with sea water in an absorption column to collect a liquid phase in a sump of the column containing bisulfite resulting from sulfur dioxide scrubbed from the flue gas by the sea water and to produce a scrubbed gas having a reduced sulfur dioxide content;

(b) aerating the liquid phase in the sump to transform the bisulfite to bisulfate;

(c) withdrawing the liquid phase containing bisulfate from the sump and mixing the withdrawn liquid phase with fresh sea water in a reaction basin to convert the bisulfate to sulfate and at least partially neutralize the liquid phase in the reaction basin;

(d) measuring a pH of the liquid phase withdrawn from the sump and determining a deviation of the measured pH from a setpoint pH in the range of pH=4.0 to pH=5; and (e) depending upon the deviation selectively feeding an additional stream of sea water directly to the sump, and recycling a liquid stream withdrawn from the sump to an absorption zone of the column at a controlled rate to minimize the deviation.

Preferably the pH value in the liquid sump is set in the range between 4.15 and pH 4.5. In the reaction basin, moreover, by the addition of fresh sea water, a pH value of at least 6.0 is preferably established.

With the process of the invention, the oxidation of the desulfurization products takes place in the liquid sump of the absorption column to which sufficient sea water is metered that the bicarbonate content will suffice for a stoichiometric conversion of all of the absorbed bisulfate to the bisulfite.

The amount of scrubbing liquid which is fed to the absorption zone can thus be dimensioned without concern for the described chemical reactions so that in the absorption column, the scrubbing efficiency can be determined exclusively by the ratio of the sulfur dioxide starting concentration to the sulfur dioxide final concentration in the flue gas. In other words, while the scrubbing can be effected with a quantity of sea water which is the minimum required for

3 maximum scrubbing efficiency independently of the chemical reactions to be carried out, the quantity of the scrubbing sea water used does not limit the subsequent reactions in the sump.

Preferably an absorption column is used which is free from baffles in the absorption zone and thus free from packing as usually provided. This permits the liquid throughput to be optimized.

If the scrubbing liquid volume in the absorption zone is so small that the bicarbonate contained in the sea water is not sufficient to chemically bind the absorbed sulfur dioxide, the additional bicarbonate is available from the sea water which is directly fed to the scrubbing column sump in accordance with the invention. Furthermore, if the absorption liquid volume is so large that the sea water in the sump has a superstoichiometric amount of bicarbonate, a recycle of the liquid from the sump to the absorption zone is provided to restore the pH value in the sump to its set point value. The scrubbing liquid recycle allows the bicarbonate levels and the hydraulic loading of the absorption zone to be set independently from one another. During this operation, of course, direct feed of additional sea water to the sump is discontinued.

By control of the pH in the sump at the indicated setpoint levels, the liquid phase withdrawn from the sump can contain no unbound sulfur dioxide in solution which can be released from the reaction basin and from toxic or noxious fumes in the region thereof. The sulfur dioxide is converted in the sump and the bisulfite and then by aeration into bisulfate. The setting of a pH value between 4.0 and 5, preferably between 4.15 and 4.5, insures a maximum bisulfite concentration in a relatively small liquid flow and thus provides the basis for rapid conversion to bisulfate.

Because of the highly acidic medium, a high oxidation velocity is insured so that the liquid in the sump can be fully reacted even with a short residence time. Depending upon the flue gas composition and the sea water composition, residence times between 1 and 2.5 min will usually suffice for the purposes of the invention. Because of the small liquid flow volumes, high oxidation velocity, the oxidation in the liquid sump can be carried out with a minimum of capital expenditure, e.g. smaller compressors, and hence at lower overall cost. The smaller liquid volumes which are necessary require reduced oxidation air flows.

The aeration for oxidation of the liquid in the sump is found to effectively strip carbon dioxide from the liquid phase in the absorption column and there is, as a result, a reasonably complete carbon dioxide stripping from in approximately carbon dioxide saturated solution. The result is a largely neutralized waste water containing bisulfate as an intermediate product and which is withdrawn from the sump and treated with fresh sea water in the reaction basin for completion of the neutralization and sulfate form reactions. As a rule, aeration of the reaction basin is not required since the oxidation of the bisulfate has already been completed in the sump and large amounts of $CO_2$ have already been driven out of the scrubbing liquid. By comparison to the prior art system, a significantly smaller reaction basin can be used and the air requirements and energy requirements for compression of the oxidation air are likewise reduced. Preferably, the air stream used for aerating the sump of the column is cooled before introduction into the sump by spraying or injecting water into the air.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
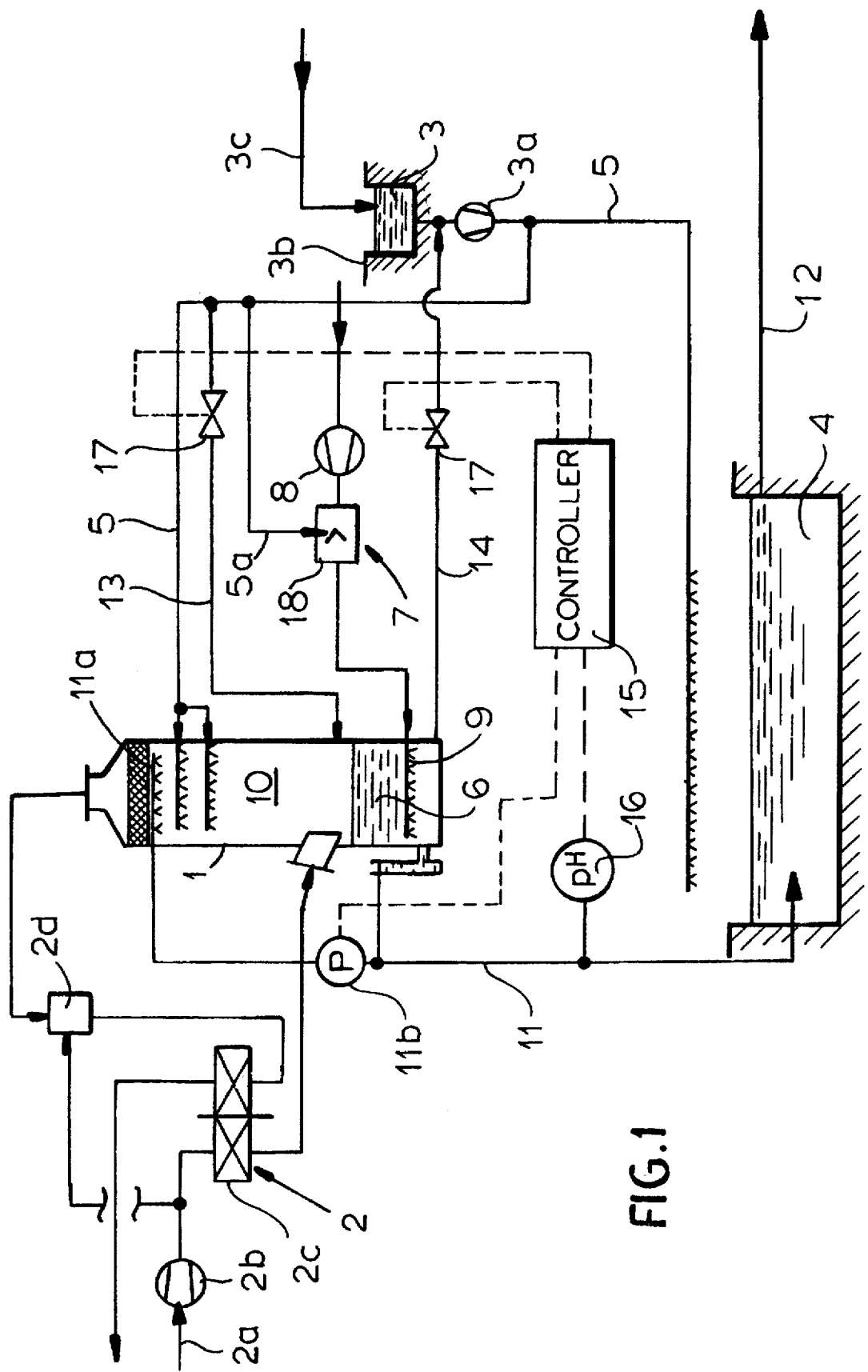
FIG. 1 is a diagram of an apparatus for carrying out the process of the invention.

The apparatus shown in FIG. 1 comprises an unpacked or baffle free absorption column 1 with a flue gas duct system 2, a sea water pump station 3 and an after reaction basin 4. Sea water feed lines 5 carry sea water from the pump 3a of the pumping station 3 whose reservoir 3b is refilled as shown at 3c, to the absorption column 1 and the reaction basin 4, as well as to the sump 6 of the absorption column 1.

The latter is provided with air jets or lances 9 for injecting aerating air from a compressor 8 into the sump, the air injected by the aerating unit represented as a whole at 7, being cooled by spraying sea water into the air in a cooler 18, the sea water being fed via line 5a from the pump 3a to the spray nozzles of the cooler 18.

The absorption column 1 is shown as a counterflow scrubber into which the sea water is fed in one or more nozzle planes of the absorption zone 10.

The liquid phase collected in the sump 6 can be recycled to the absorption zone via spray nozzles 11a and a pump 11b, the latter being controlled by a pH controller 15 whose function will be described in greater detail hereinafter.

From the line 11, the liquid phase is fed to the reaction basin 4 which can return the treated water to the sea as represented at 12, sulfates being recovered, if desired, by precipitation either within the basin 4 or in an additional system as may be desirable.

The invention utilizes the alkalinity of sea water, which is usually given in terms of $HCO_3^-$ to bind and neutralize the $SO_2$ absorbed from the flue gas. Standard sea water with a chlorine titer of 19 g/kg can have an $HCO_3$ content of 0.14 g/kg. Depending upon the source of the sea water, the bicarbonate content can be as much as 0.32 g/kg, for example for Arabian Gulf water. An amount of 0.14 g/kg thus can be considered an average with local variations in either direction and depending upon where the water is taken, for example, at a deep location or in the neighborhood of a mouth of a river (see (ULLMANN, Vol. 24, Pages 213/214).

The flue gas, fed at 2a via a compressor 2c in which it is passed in indirect heat exchange with desulfurized flue gas, is fed to the absorption column 1 and is there treated with sea water so that the gaseous sulfur dioxide is physically absorbed in the sea water

$$SO_2(gas) \xrightarrow{H_2O} SO_2(L) \text{dissolved}$$

The sea water quantity used for the absorption is so dimensioned that the sea water bicarbonate is only sufficient for stoichiometric conversion of the absorbed sulfur dioxide to bisulfite.

The sump 6 of the absorption column is aerated to convert the bisulfite to bisulfate. The bisulfate formation reaction can be considered to follow the reaction scheme:

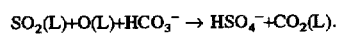

$$SO_2(L) + O(L) + HCO_3^- \rightarrow HSO_4^- + CO_2(L).$$

The bisulfate containing liquid is withdrawn from the sump and, for the purpose of sulfate formation and pH adjustment, is fed to the reaction basin 4 to which fresh sea water is supplied. The net sulfate forming reaction in the basin 4 follows the relation:

$$HSO_4^- + HCO_3^- \rightarrow SO_4^{-2} + H_2O + CO_2(L).$$

The desulfurized gas, to which a portion of the flue gas can be admixed at 2d, if desired, is then passed through the heat exchanger 2c and is discharged into the atmosphere.

Figure 2:
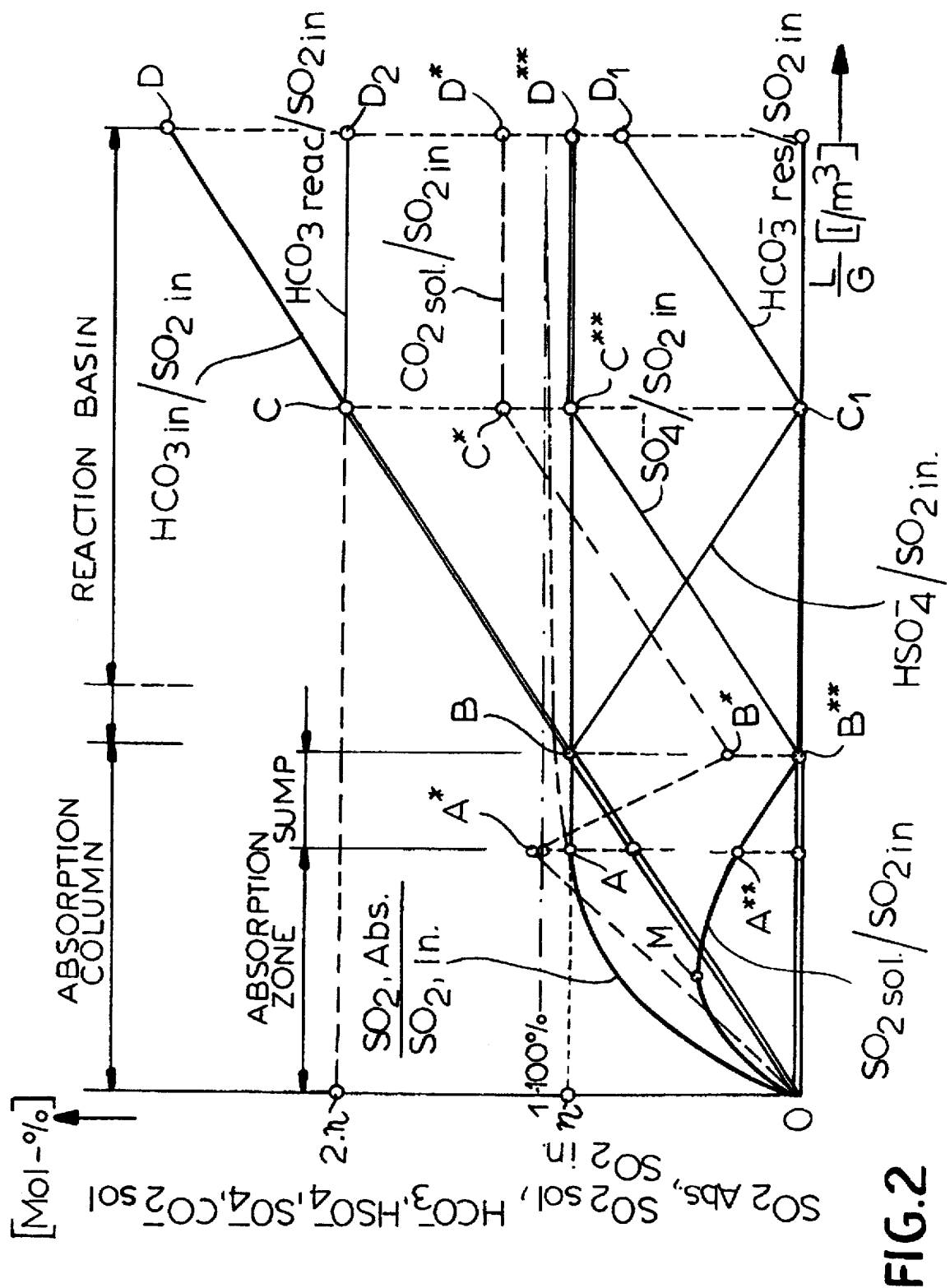
FIGS. 2 and 3 are graphs illustrative of the reactions.

The chemical reactions which are carried out have been modeled in FIG. 2. In this graph, the sea water quantity supplied to the apparatus is plotted along the abscissa in terms of the flue gas volume flow L/g, in 1/m³. Along the ordinate, the molar amounts of the starting and reaction products are given with respect to the molar quantity of $SO_2$ in the flue gas in mole percent. The washer efficiency η is likewise given. The graph comprises:

a segment OABC D representing the recovered sulfur dioxide quantity ($SO_2$, $_{Abs}$/$SO_2$ $_{in.}$);

a segment OBCD representing the supplied bicarbonate quantity ($HCO_3^-$ $_{in.}$/$SO_2$ $_{in.}$) and a segment $OBCD_2$ representing total reacted bicarbonate ($HCO_3^-$ $_{reacted}$/$SO_2$ $_{in.}$); and a segment OB representing the converted portion in the absorption column alone;

a segment OMAB representing the proportion of free $SO_2$ in the solution ($SO_2$ $_{dissolved}$/$SO_2$ $_{in.}$) corresponding to the difference between removed $SO_2$ and reacted bicarbonate;

a segment $C_1D_1$ representing excess nonreacted bicarbonate ($HCO_3^-$ $_{residual}$/$SO_2$ $_{in.}$) in the reaction basin.

A line segment $OBC_1$ representing the supplied and withdrawn bisulfate ($HSO_4^-$/$SO_2$ $_{in.}$) in the sump of the absorption column or in the reaction basin;

a line segment BC representing a corresponding increase in the sulfate ($SO_4^-$/$SO_2$ $_{in.}$) in the reaction basin; and line segments OA*, A*B*, B*C* representing the dissolved $CO_2$ content in the liquid ($CO_2$ $_{dissolve}$/$SO_2$ $_{in.}$).

In the absorption zone 10 of the absorption column 1, a $CO_2$ saturation of the sea water is effected (line OA*). In the sump, $CO_2$ is driven out by the oxidation air (line A*B*). In the reaction in the basin 4 there is again an enrichment in the water with dissolved carbon dioxide (line B*C*). The pH of the water withdrawn at 12 from the basin 4 is primarily dependent upon the concentration of free $CO_2$ (point D*) and surplus bicarbonate (point $D_1$). These can be affected by increasing the total sea water quantity used. There is also a limited effect through the $CO_2$ stripping in the reaction vessel 4.

FIG. 2 relates to a mode of operation of the apparatus in which the sea water is fed in partial streams through the absorption column. A first such stream is used as the scrubbing liquid and is supplied through one or more nozzle planes in the absorption zone 10 of the column. The bicarbonate quantity of the scrubbing liquid is not sufficient for complete chemical binding of the absorbed $SO_2$. Another sea water stream to compensate the balance of the bicarbonate is fed directly via line 13 into the sump 6.

When the liquid quantity required for the gas scrubbing is such that the bicarbonate collected in the sump is superstoichiometric with respect to the absorbed $SO_2$, a recycle via line 14 from the sump 6 to the sea water distribution pump 3a or via pump 11b to the nozzle plane 11a is advantageous. This case arises when the $SO_2$ concentration in the flue gas is low and a sea water with a high carbonate content is used. The scrubbing liquid recycle allows the bicarbonate content in the sump and the hydraulic loading of the absorption zone to be set independently of one another.

Figure 3:
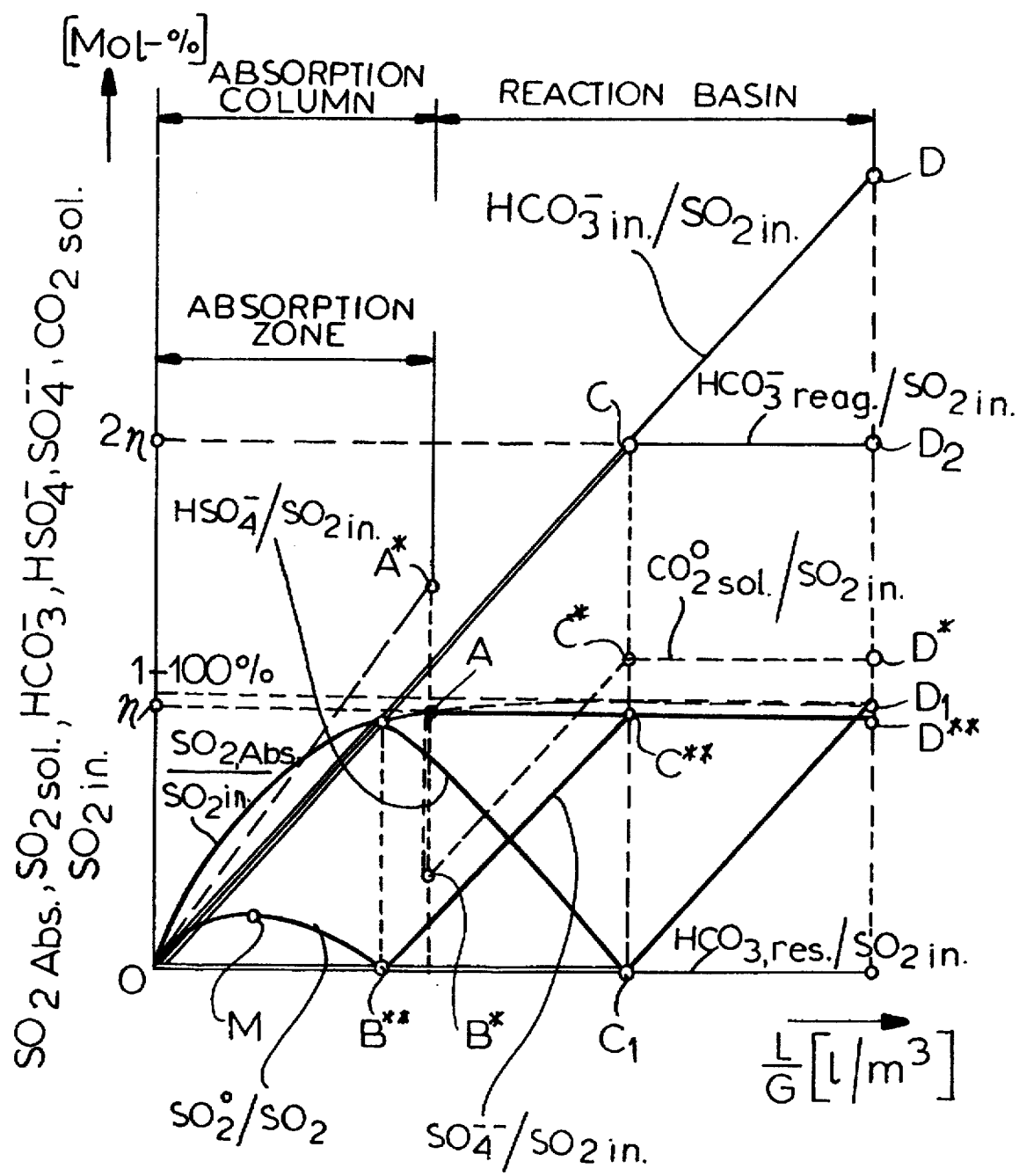

FIG. 3 shows the chemistry of this latter case. The fresh water feed via line 13 can be terminated. The sulfate forming reaction, as FIG. 3 shows, occurs partially in the sump 6. With the recycled liquid via line 14, for example, the bicarbonate content can be controlled.

Both the additional feed 13 and the recycled feed 14 are controllable in response to the pH value of the liquid withdrawn from the sump 6. This is represented by the controller 15 with its pH sensor 16 for determining the actual pH value and control units such as the valves 17 and pump 11b for regulating the additional sea water flow to the column and the recycled liquid from the column sump to the spray nozzles.

The pH values are measured via the sensor 16, compared with a setpoint in the pH range of 4.15 to 4.5 and controlled to maintain the setpoint value within a narrow tolerance range.

Figure 4:
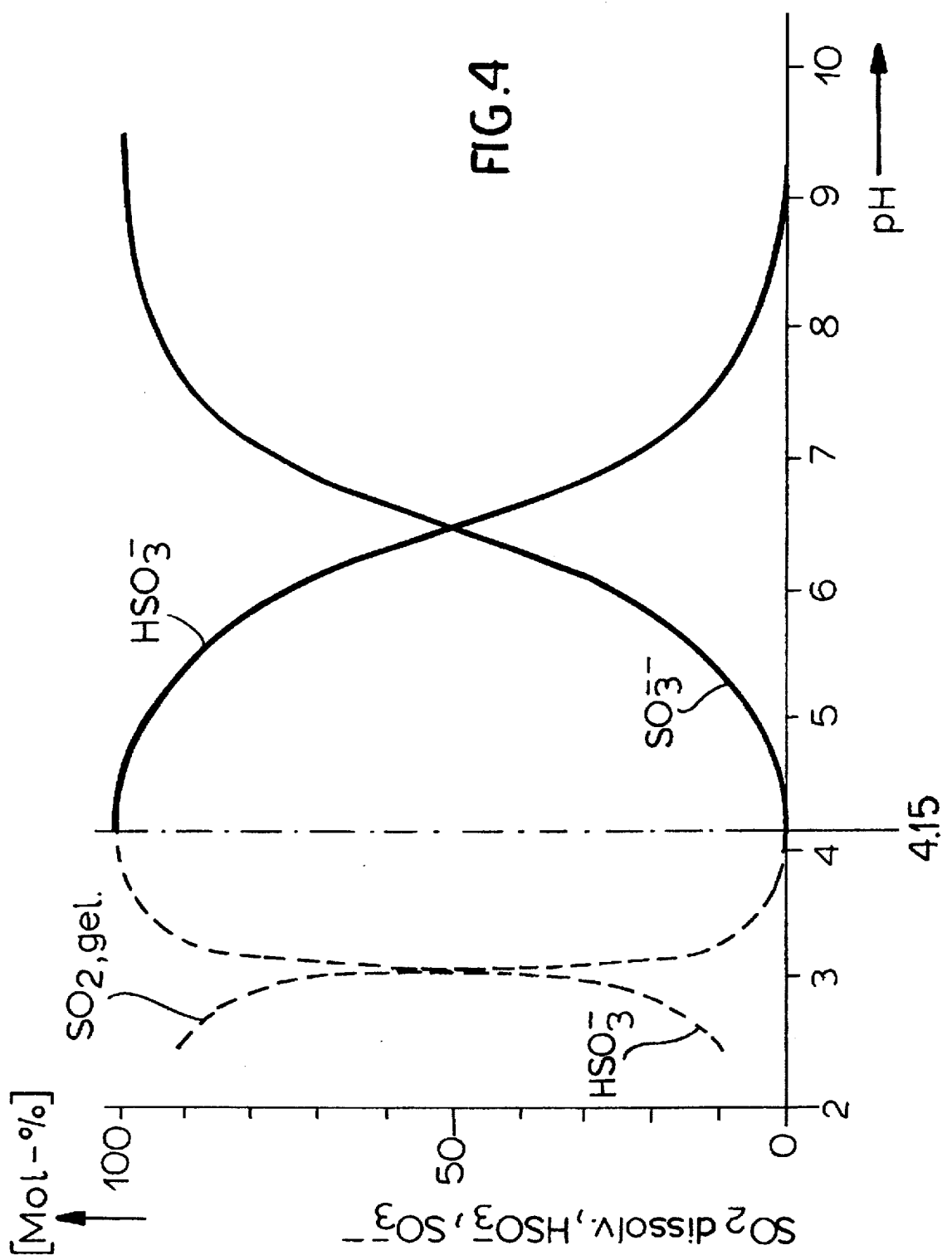
FIG. 4 is a graph showing the equilibrium distribution of dissolved sulfur dioxide by sulfide ions and sulfur ions in sea water in dependence upon the pH value.

FIG. 4 shows the equilibrium distribution of dissolved and unbound $SO_2$, bisulfite and sulfate ions in sea water. From FIG. 4 it will be apparent that in sea water the maximum bisulfite concentration can be expected at pH 4.15. With reduced pH values there may still be residues of dissolved, unbound $SO_2$ in solution while with higher pH values smaller amounts of sulfite ion can be encountered. With the method of the invention, an exact metering and control of the sea water can be provided to insure that all of the absorbed $SO_2$ is completely bound and no free or unbound $SO_2$ remains in solution which can be released into the atmosphere from the basin.

The pH setting in the range of 4.15 to pH 4.5 insures that the pH value of the liquid phase withdrawn from the sump will be very close to the optimal point for bisulfite formation. The subsequent reactions can take place in the basin without liberation of $SO_2$ and because of the high bisulfate concentration prevalent in the sump 6, the oxidation takes place there also very rapidly. The high oxidation velocity means that the liquid resistance time in the sump can be short, usually between 1 and 2.5 minutes.

In the reaction basin 4, the pH is brought to 6.0 to 7 by the addition of the fresh sea water and about ⅓ of the sea water is supplied in the scrubbing column 1 and ⅔ to the reaction basin. Furthermore, since the oxidation takes place in the sump 6 rather than in the case of prior art systems, in a reaction basin, smaller air quantities can be used especially when the air is cooled by water injection utilizing a mixing chamber 18 and sea water for the cooling.

We claim:

1. A process for separating sulfur dioxide from a flue gas consisting essentially of the steps of:

(a) contacting a flue gas containing sulfur dioxide with sea water in an absorption column to collect a liquid phase in a sump of said column containing bisulfite resulting from sulfur dioxide scrubbed from said flue gas by the sea water and to produce a scrubbed gas having a reduced sulfur dioxide content;

(b) aerating said liquid phase in said sump to transform said bisulfite to bisulfate;

(c) withdrawing said liquid phase containing bisulfate from said sump and mixing the withdrawn liquid phase with fresh sea water in a reaction basin to convert the bisulfate to sulfate and at least partially neutralize the liquid phase in said reaction basin;

(d) measuring a pH of the liquid phase withdrawn from said sump and determining a deviation of the measured pH from a setpoint pH in the range of pH=4.0 to pH=5; and (e) depending upon said deviation selectively feeding an additional stream of sea water directly to said sump, and recycling a liquid stream withdrawn from said sump to an absorption zone of said column at a controlled rate to minimize said deviation and to keep the pH value of the liquid phase in the sump for the aeration step (c) in the range of pH 4.0 to 5.

2. The process defined in claim 1, further comprising the step of establishing said setpoint at a pH between pH=4.15 and pH=4.5.

3. The process defined in claim 2 wherein a pH of at least 6 is established in said reaction basin in step (c) by addition of fresh sea water thereto.

4. The process defined in claim 3 wherein said absorption column is operated with a baffle-free absorption zone.

5. The process defined in claim 4 wherein air used to aerate said sump in step (b) is cooled by spraying water into said air.

6. The process defined in claim 1 wherein a pH of at least 6 is established in said reaction basin in step (c) by addition of fresh sea water thereto.

7. The process defined in claim 1 wherein said absorption column is operated with a baffle-free absorption zone.

8. The process defined in claim 1 wherein air used to aerate said sump in step (b) is cooled by spraying water into said air.

9. The process defined in claim 1 wherein according to step (b) the residence time of the liquid phase aerated in the sump to transform the bisulfite to the bisulfate is 1 to 2.5 minutes.

* * * * *